US006712323B1

(12) United States Patent
Cheung et al.

(10) Patent No.: US 6,712,323 B1
(45) Date of Patent: Mar. 30, 2004

(54) RECORDING SENSOR MOUNTING BRACKET FOR ACOUSTIC PIANOS

(75) Inventors: Alpha Cheung, Sacramento, CA (US); Daniel Mattsson-Boze, Sacramento, CA (US)

(73) Assignee: Burgett, Inc., Sacramento, CA (US)

( * ) Notice: Subject to any disclaimer, the term of this patent is extended or adjusted under 35 U.S.C. 154(b) by 0 days.

(21) Appl. No.: 10/039,416

(22) Filed: Jan. 4, 2002

(51) Int. Cl.[7] .............................................. F16M 11/00

(52) U.S. Cl. .................. 248/201; 248/222.11; 248/300

(58) Field of Search ........................... 248/225.11, 235, 248/300, 346.01, 346.03, 694, 316.2–316.3, 222.11, 57, 906, 201; 84/461, 462, 423 R; 361/679, 680

(56) References Cited

U.S. PATENT DOCUMENTS

| | | | | | |
|---|---|---|---|---|---|
| 2,480,805 | A | * | 8/1949 | Buckels | 248/219.4 |
| 3,365,156 | A | * | 1/1968 | Beck | 248/205.1 |
| 4,310,135 | A | * | 1/1982 | Dobson | 248/222.12 |
| 4,658,968 | A | * | 4/1987 | Mastrodicasa | 211/153 |
| 4,905,438 | A | * | 3/1990 | Brennan | 52/288.1 |
| 5,138,116 | A | * | 8/1992 | Kabayama | 174/138 G |
| 5,524,521 | A | | 6/1996 | Clift et al. | |
| 5,911,169 | A | | 6/1999 | Lichtenstein | |
| 6,045,386 | A | * | 4/2000 | Boe | 439/327 |
| 6,143,970 | A | * | 11/2000 | Kowzan | 211/70.1 |
| 6,209,838 | B1 | | 4/2001 | Anderson et al. | |
| 6,241,206 | B1 | * | 6/2001 | Kam | 248/247 |
| 6,262,883 | B1 | * | 7/2001 | Kim | 361/679 |
| 6,424,542 | B1 | * | 7/2002 | Benson | 361/759 |

* cited by examiner

*Primary Examiner*—Korie Chan
(74) *Attorney, Agent, or Firm*—John P. O'Banion

(57) ABSTRACT

A mounting bracket for supporting a key movement recording sensor assembly within a keyboard-operated musical instrument. The mounting bracket of the present invention incorporates a locking mechanism to prevent sensor assembly movement and it preferably conforms to a portion of the hammer flange assembly to reduce vertical space requirements. The locking mechanism, or alternatively the sensor board itself, provides a biasing force for engaging the sensor assembly. Applying a sufficient manual force to a release member on the locking mechanism overcomes the biasing force to unlock the sensor assembly to allow for the insertion, adjustment, or removal of the sensor assembly from the mounting bracket. A keyed retention mechanism augments the sensor assembly to simplify engagement and adjustment of the sensor assembly.

53 Claims, 9 Drawing Sheets

RECORDING SENSOR MOUNTING BRACKET FOR ACOUSTIC PIANOS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A COMPUTER PROGRAM APPENDIX

Not Applicable.

BACKGROUND OF THE INVENTION

1. Field of the Invention

The present invention generally pertains to keyboard-operated musical instruments, and more particularly to a mounting bracket for supporting a recording sensor assembly within an acoustic piano.

2. Description of the Background Art

Acoustic pianos and similar mechanically operated musical instruments often incorporate recording sensors for registering the movement of the keys during a session in which the instrument is being played. The sequence of registered key activity may be subsequently utilized by an electronic player mechanism, in the same instrument or other instruments, to activate the keys of the instrument to substantially reproduce the music of the original session in which the key movements were registered.

Recording sensors are typically mounted either beneath the keyboard of the instrument to sense the movements associated with each key, or more preferably proximal to the action stack for sensing the movement of the hammer shanks. It will be appreciated that numerous elements of an acoustic piano are subject to movement in response to the operation of a key. Within a typical piano, for example, key operation may be sensed directly or by sensing the movement of the hammers, hammer shanks, or other parts which move in response to key operation. A separate sensor is utilized for each key to allow the actions of every key to be properly registered. It should be appreciated that modern recording sensors are capable of recording subtle keystroke nuances and can very accurately sense the position and velocity with which the keys are operated. Achieving this level of accuracy, however, requires that the sensors be positioned accurately with respect to each key with the assurance that the position of each sensor will not shift over time. To achieve sensor positioning accuracy and to simplify mounting, sensors are generally manufactured within sensor assemblies that contain a plurality of sensor elements. Each sensor assembly typically comprises a substantially flat printed circuit board upon which the sensor circuitry has been mounted. On acoustic pianos, the sensor assemblies are generally installed above the hammer shanks.

The direct mounting of sensor assemblies proximal to the action stack of an acoustic piano, without the use of a mounting bracket, can provide a compact installation, however, difficulties arise with regard to installation, adjustment, and maintenance of the associated sensor circuits. In addition, the spacing of internal structures within the instrument can differ substantially from one piano make and model to another. Therefore, a number of mounting brackets and rails have been developed by manufacturers for retaining sensor assemblies within a variety of acoustic pianos and other similar musical instruments.

One such mounting apparatus retains sensor assemblies within a mounting rail, such as a U-shaped channel. The use of mounting rails allows the position of the retained sensor assemblies to be adjusted along the length of the rail to align with the hammer shanks and then to be locked in place by inserting and engaging a separate fastener. The use of rail mounts and other typical sensor assembly mounts, requires the removal of one or more fastener elements prior to inserting, adjusting, or removing a sensor assembly.

Utilizing mounts for retaining sensor assemblies within the piano, or equivalent, can also give rise to another set of problems. In particular, a situation can arise in which the added size of a mounted sensor assembly interferes with proper hammer motion and thereby compromises the quality of instrument operation. Such a situation may arise from using a sensor assembly mount that requires more vertical spacing than exists above the hammer shanks within the instrument. For example, in the case of a mounting rail, it will be appreciated that sufficient vertical clearance is necessary for the combination of sensor assembly, the thickness of the mounting rail material, and the clearance between the mounting rail and the bottom of the sensor assembly. Furthermore, the adjustment, removal, or re-insertion of a sensor assembly within the mounting device is generally cumbersome, and typically requires the use of tools for manipulating one or more fasteners.

Therefore, a need exists for a sensor mounting apparatus that simplifies the sensor assembly mounting and adjustment process within various acoustic piano makes and models while minimizing the vertical space requirement. The present invention satisfies those needs, as well as others, and overcomes the deficiencies of previously developed recording sensor mounting apparatus.

BRIEF SUMMARY OF THE INVENTION

The present invention comprises a mounting bracket for supporting a recording sensor assembly Within a keyboard-operated musical instrument, such as an acoustic piano, or similar. A sensor assembly may be readily inserted, adjusted, or removed from the mounting bracket by applying a manual force, such as to a release member, without the need to remove or install fasteners. The mounting bracket is capable of supporting a sensor assembly in approximately the same vertical space as would be required to attach the bare sensor assembly within the instrument.

The mounting bracket attaches to the action stack to support a sensor assembly on a portion of the bracket which is attached adjacent to the side of the respective hammer flanges. Since the vertical thickness of the bracket supporting the sensor assembly is positioned between the hammer flanges, as contrasted to above the hammer flanges in the case of a mounting rail, the present mounting bracket can be designed with negligible vertical space penalty. Therefore, a sensor assembly may be mounted using these brackets in approximately the same vertical space as would be required to fasten an unmounted sensor assembly to the action stack. When mounted within an acoustical piano, the portion of the bracket which supports the sensor assembly is joined to a substantially horizontal portion of the bracket that overlies the hammer flange and is adapted with an opening through which the hammer flange fastener has been received. Preferably, the mounting bracket of the present invention substantially conforms to a portion of the horizontal and vertical surfaces of the hammer flange. It is also preferable that two mounting brackets be utilized to support each sensor assembly, and that multiple mounting brackets are utilized within the piano to properly maintain the position of a number of sensor assemblies in relation to the hammer shanks, or other moving parts that are activated in response to operation of the keys. It will be appreciated, however, that the number of sensor mounting brackets utilized for supporting the sensor assemblies is a matter of choice.

A number of embodiments are described for the present invention which provide mechanisms for retaining a sensor assembly within a bracket which is designed to occupy a minimum amount of vertical space. One group of embodiments within the present invention support the sensor assembly with a locking mechanism that is configured with a release member. A sensor assembly may be received, adjusted, or removed from the mounting bracket by applying a sufficient urging force in a substantially predetermined direction to said release member. Preferably, the release member may be activated by using the fingers or thumb, to apply pressure in the correct direction on the release member to disengage a locking mechanism. Upon releasing pressure on the release member, the locking mechanism supplies a biasing engagement force to engage the sensor assembly and thereby lock its position within the mounting bracket. Another embodiment utilizes the characteristics of the sensor board itself to effect retention within the mounting bracket. Shown by way of example is a mounting bracket in which the flexure of the sensor assembly itself during receipt within the mounting bracket provides a biasing force to prevent vibration of the sensor assembly while aiding retention of the assembly within the bracket.

The releasable locking mechanism described within the first set of embodiments of the present invention is shown, by way of example, comprising a combination of a fixed retention member and a biasing retention member. The biasing retention member operating to lock the position of the sensor board within the mounting bracket. Prior to engagement of the biasing retention member, the fixed retention member acts as a limiter on vertical and longitudinal sensor assembly motion while not restricting lateral motion of the sensor assembly. When released and allowed to exert a bias force, the biasing engagement member applies retention pressure to the sensor assembly against the fixed retention member to lock the sensor assembly in a fixed position. It will be appreciated that the biasing retention member may be alternately adapted to exert an extension force in relation to a fixed retention member which engages a portion of the sensor assembly in an opposing direction.

To simplify the insertion, alignment, and positioning of the sensor assembly, a separate keyed retention mechanism is preferably incorporated within the mounting bracket. The keyed retention mechanism operates in combination with the locking mechanism. The keyed retention mechanism engages the sensor assembly to prevent the sensor assembly from shifting in a longitudinal direction which is parallel to the length of the hammer shanks. The keyed retention mechanism may also be configured so as not to be fully insertable within the sensor assembly such that the sensor assembly needs to be flexed for engagement within the mounting bracket.

It should be appreciated that more than two retention members may be incorporated per each mounting bracket without departing from the present invention. The locking retention mechanism, preferably in combination with the keyed retention mechanism, therefore operates to maintain sensor assembly position at a fixed location within the instrument to which it is attached so that positional adjustment, insertion, and removal of the sensor assemblies is readily achieved.

An object of the invention is to provide low-profile mounting of sensor assemblies proximal to the hammer shanks within an acoustic piano.

Another object of the invention is to provide a mounting bracket that allows for accurate alignment and secure positioning of recording sensor assemblies in relation to the hammer shanks, or other moving parts associated with the key operation within an acoustic piano.

Another object of the invention is to provide a mounting bracket that may be utilized with a variety of acoustic piano makes and models without compromising the instrument operation.

Another object of the invention is to provide a bracket for mounting sensor assemblies wherein multiple brackets may be compatibly utilized per instrument and/or sensor board without interfering with one another.

Another object of the invention is to provide a mounting bracket that is capable of retaining the sensor assembly in a fixed location that is substantially immune to instrument vibration.

Another object of the invention is to provide a mounting bracket that may be readily attached, or removed, from an instrument.

Another object of the invention is to provide a mounting bracket that securely retains a sensor assembly and prevents inadvertent shifting.

Another object of the invention is to provide a mounting bracket that is capable of retaining a sensor assembly without the need of separate fasteners, such as threadable fasteners, wherein the sensor assembly can be more readily inserted and removed for maintenance and repairs.

Another object of the invention is to provide a mounting bracket from which sensor assemblies may be adjusted, removed, or inserted in response to a simple one-touch manual operation by the technician.

Another object of the invention is to provide a bracket design that is reliable and may be manufactured at low cost.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes, the present invention is embodied in the apparatus generally shown in FIG. 1 through FIG. 9. It will be appreciated that the apparatus may vary as to configuration and as to details of the parts, and that the method may vary as to the specific steps and sequence, without departing from the basic concepts as disclosed herein.

Figure 1:
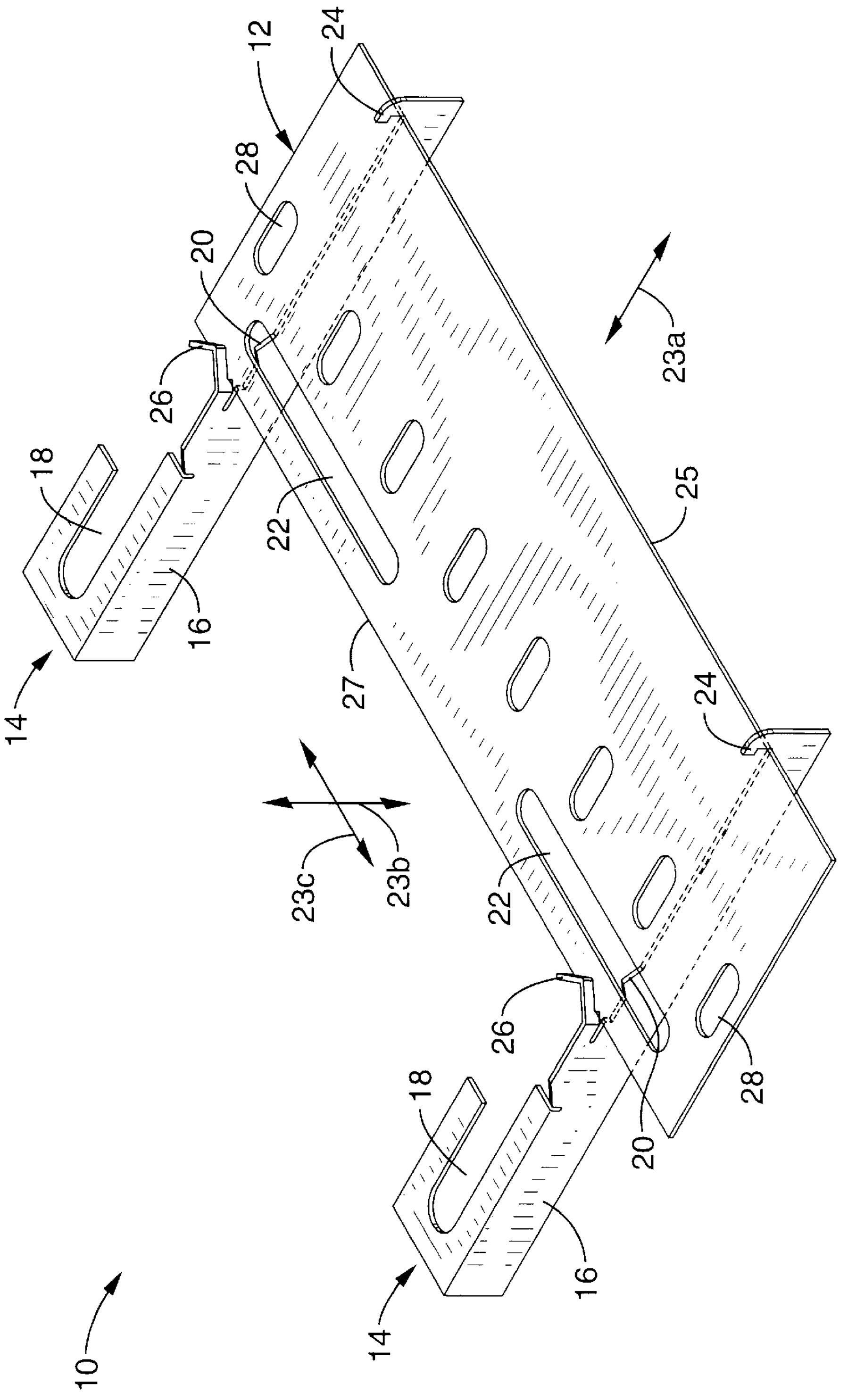
FIG. 1 is a perspective view of a sensor assembly received within as mounting bracket according to an embodiment of the present invention, shown for mounting on the action stack within an acoustic piano.
Figure 2:
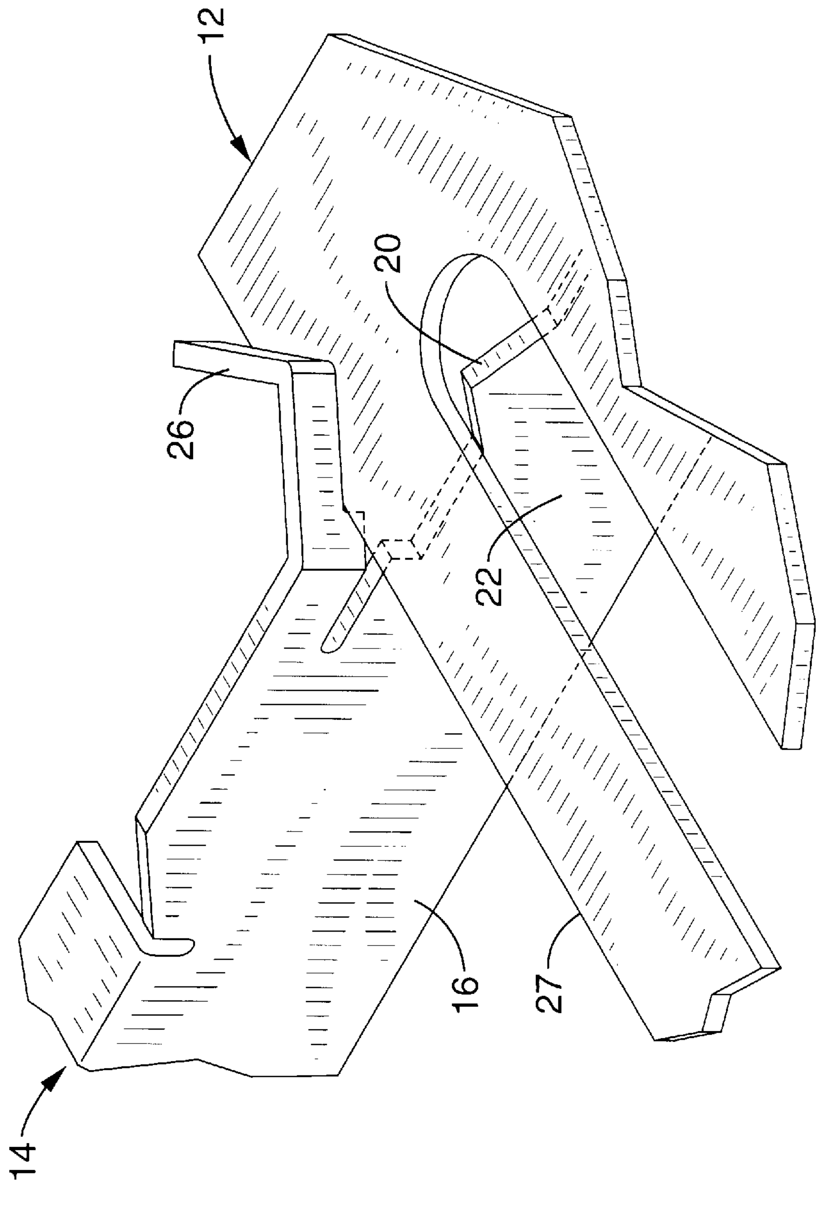
FIG. 2 is a detailed perspective view of the locking mechanism of FIG. 1, shown engaging the sensor assembly for retention.

FIG. 1 and FIG. 2 illustrate a mounted sensor assembly 10, wherein a sensor assembly 12 is shown retained by a pair of mounting brackets 14, which are shown separate from an acoustic piano into which they would be installed. It should be readily appreciated that each mounting bracket 14 would typically be installed within an instrument prior to installation of sensor assembly 12. A number of sensors (not shown) are incorporated within sensor assembly 12 to sense hammer shank movement, or the movement of other mechanical elements which move in response to the displacement of the piano keys. A plurality of sensor assemblies are typically incorporated within a piano so that the operation of every key may be registered. It will be appreciated that a typical piano requires a sufficient number of sensors to monitor eighty eight keys.

A pair of mounting brackets 14 are shown retaining sensor assembly 12. The body of each mounting bracket 14 is preferably fabricated from a metallic material, such as spring steel or other easily formed resilient material, and is preferably designed to conform to a portion of the horizontal and vertical surfaces of the hammer flange assembly to reduce vertical space requirements. The mounting brackets should be fabricated from a sufficiently thin material so as not to unduly increase the height of the mounted sensor board, and should be mechanically configured so as to accommodate the spacing which exists between the hammer shanks. It will be appreciated, therefore, that the mounting brackets may be fabricated from a variety of plastics, resins, metals, and so forth without departing from the present invention. A preferred embodiment of the mounting bracket is shown fabricated from a spring steel material of a thickness between approximately ten and thirty mils that has been cut and bent to shape. Twenty mil spring steel was utilized within a preferred embodiment as it was found to provide a suitable tradeoff between rigidity and ease of deflection. Mounting bracket 14 comprises a vertical support arm 16 adapted with means for supportive retention of the sensor assembly, such as a locking mechanism. The vertical region of the mounting bracket is coupled with a horizontal region of material that at least partially surrounds a mounting cutout 18, whose geometry and orientation provide proper low-clearance engagement under the hammer flange fastener, typically a screw. Mounting cutout 18 is preferably provided as an open area of a size and shape to accommodate the receipt of the shaft of the hammer flange fastener.

The retention means primarily comprises a locking mechanism that applies a biasing force to restrict sensor assembly movement. The locking mechanism is preferably augmented with a keyed retention mechanism that simplifies sensor assembly insertion and adjustment. The keyed retention mechanism prevents longitudinal movement parallel to the hammer shanks when the locking mechanism is disengaged. The two forms of retention operate in concert to provide a secure support in which lateral adjustments may be performed and sensor boards may be inserted or removed easily.

The keyed retention mechanism can be implemented as a protrusion, such as a tab that protrudes from the mounting bracket to engage an opening, slot, or similar adaptation within the sensor assembly to prevent longitudinal movement. The keyed retention mechanism is depicted as a retention tab 20 which engages a slot 22 within sensor assembly 12 to assure that the sensor assembly remains in a fixed position and does not shift in the longitudinal direction. The directions of motion in relation to a supported sensor assembly are represented as longitudinal **23*a*, lateral 23*b*, and vertical 23*c*. Protruding retention tab 20 is preferably tapered to facilitate the receipt and secure engagement with sensor assembly 12. It will also be appreciated that retention tab 20 may be configured of a width to allow for only partial insertion within slot 22 wherein the sensor assembly must be slightly flexed to provide for engagement of the locking mechanism. Partial engagement with the tapered sides of retention tab 20 can also aid in reducing sensor board movement by firmly pressing into the material of sensor assembly 12**.

The locking mechanism is implemented with a fixed retention member 24 used in combination with a biasing retention member 26. Fixed retention member 24 is exemplified as a protruding retention structure which retains a first lateral edge 25 of sensor assembly 12. Biasing retention member 26 is exemplified as a spring clip retainer which supplies a biasing force t o engage a second lateral edge 27 of sensor assembly 12 in concert with the retention provided by fixed retention member 24.

The sensor assembly itself may be configured with a number of additional cutouts and adaptations to facilitate mounting of the sensors and circuits of the sensor assembly. Shown by way of example, are a series of eight sensor mounting cutouts 28 spanning sensor assembly 12.

FIG. 2 depicts a detailed view of biasing retention member 26 which preferably comprises a spring clip retainer that engages the upper surface and second lateral edge 27 of sensor assembly 12. It will be appreciated that biasing retention member 26 may be implemented with any compliantly coupled sensor assembly engagement member, such as an elongated member extending from the mounting bracket having surfaces for engaging the top and edge surface of the sensor assembly to apply a biasing force in concert with the fixed retention member to prevent lateral and vertical movement. The keyed retention mechanism is exemplified with opening 22 within sensor assembly 12, such as a slotted lateral aperture, for engagement over retention tab 20. The use of a slotted lateral aperture allows the lateral sensor position to be adjusted when the locking mechanism is at least partially disengaged.

Figure 3:
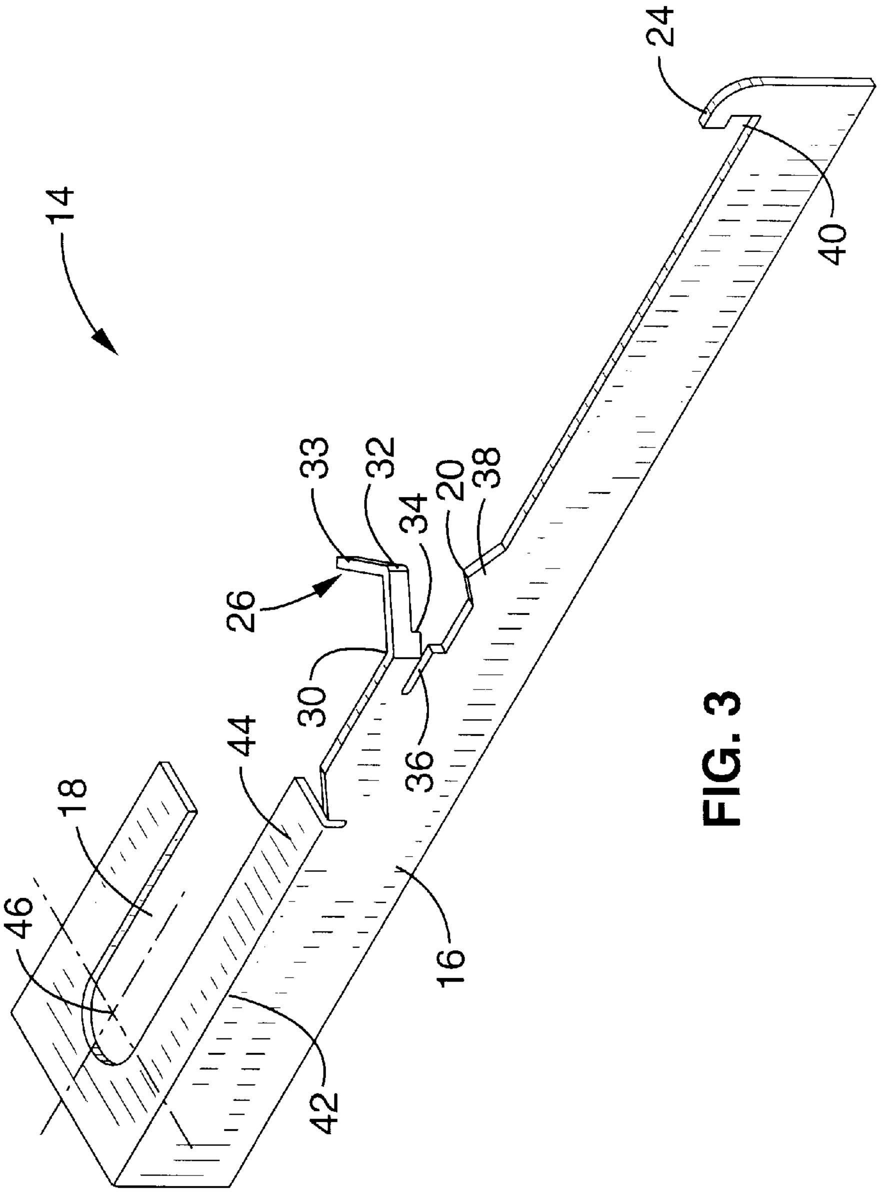
FIG. 3 is a perspective view of the mounting bracket within FIG. 1, shown prior to engaging a sensor assembly therein.
Figure 4:
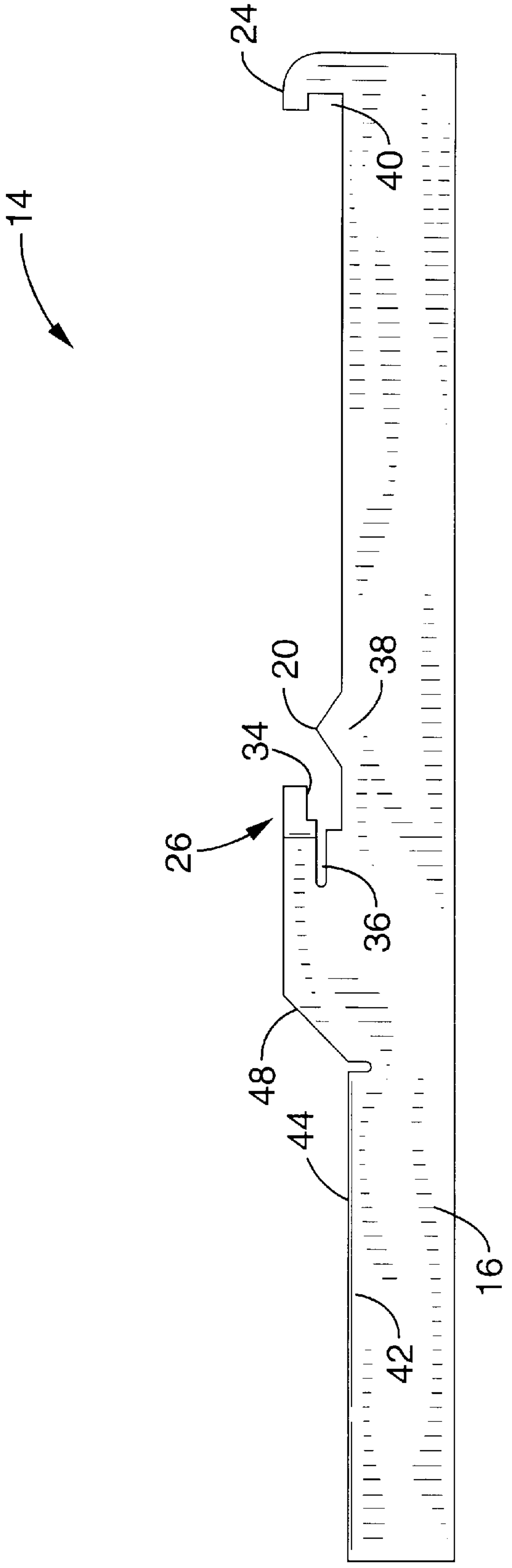
FIG. 4 is a side view of the mounting bracket of FIG. 3, showing the locking mechanism and keyed retention mechanism.

FIG. 3 and FIG. 4 illustrate mounting bracket 14 and the combination of retention mechanisms. The biasing retention member 26 is formed having a spring clip structure with a first bend 30, a second bend 32, a release member 33, and a notch 34 cut into the lower portion of the spring clip. Application of sufficient force to release member 33, in a direction away from the sensor assembly, disengages the biasing retention member 26 to allow a sensor assembly to be removed, or inserted. It will be appreciated that undue force can cause plastic deformation on release member 33, wherein the biasing retention force will be adversely affected. However, the biasing retention member will normally be subject to sufficiently small displacements under reasonable care and will thereby retain its spring-like biasing properties for many hundreds of insertion, adjustment, and removal cycles. The remaining material above notch 34 forms a horizontal edge that vertically restrains sensor assembly movement. The vertical material on the edge of notch 34 engages the exterior edge of sensor assembly 12 to apply a biasing force thereto.

The material of mounting bracket 14 should be sufficiently compliant to allow repeated activation of biasing retention member 26 by applying pressure to release member 33 for the insertion and removal of sensor assemblies. Although alternative configurations may be utilized to provide a biased engagement, it should however, be appreciated that the anticipated number of sensor assembly insertion and removal cycles will be limited during actual use and may not warrant the added cost of more elaborate biasing mechanisms. Mounting bracket 14 is preferably fabricated from metal, such as formed within a bending or stamping process. The mounting bracket may alternatively be fabricated from other suitably compliant materials which may be cast, injection molded, or otherwise formed.

A compliance slot 36 is shown cut into support arm 16 to reduce the flexure stress to which bend 30 is subject. Protruding retention tab 20 is provided as an extension of upper surface 38 of the vertical portion of support arm 16, and is shaped to engage an opening, or other engagement structure within sensor assembly 12 to prevent motion therein. Fixed retention member 24 is exemplified with a retention cutout notch 40, or slot, which preferably tapers down towards its closed end to engage sensor assembly 12, and to thereby prevent vertical and lateral movement. The taper of the cutout notch may be up to about fifteen degrees (15°) of angle, with a preferred configuration having approximately three degrees (3°) of taper.

Mounting bracket 14 includes a bend 42 at which the material of the mounting bracket transitions from a substantially vertical structure to a horizontal surface 44 (FIG. 3) to facilitate mounting to the hammer flange. Mounting cutout 18 located within horizontal mounting surface 44 is configured for retention by a fastener, such as a screw approximately centered on axis 46 within cutout 18. Typically, mounting bracket 14 is attached by way of the existing hammer flange threaded fasteners. A vertical extension 48 of support arm 16 provides sufficient material height to form biasing retention member 26 and illustrates a preferred tapering transition from bend 42 toward horizontal surface 44.

Figure 5:
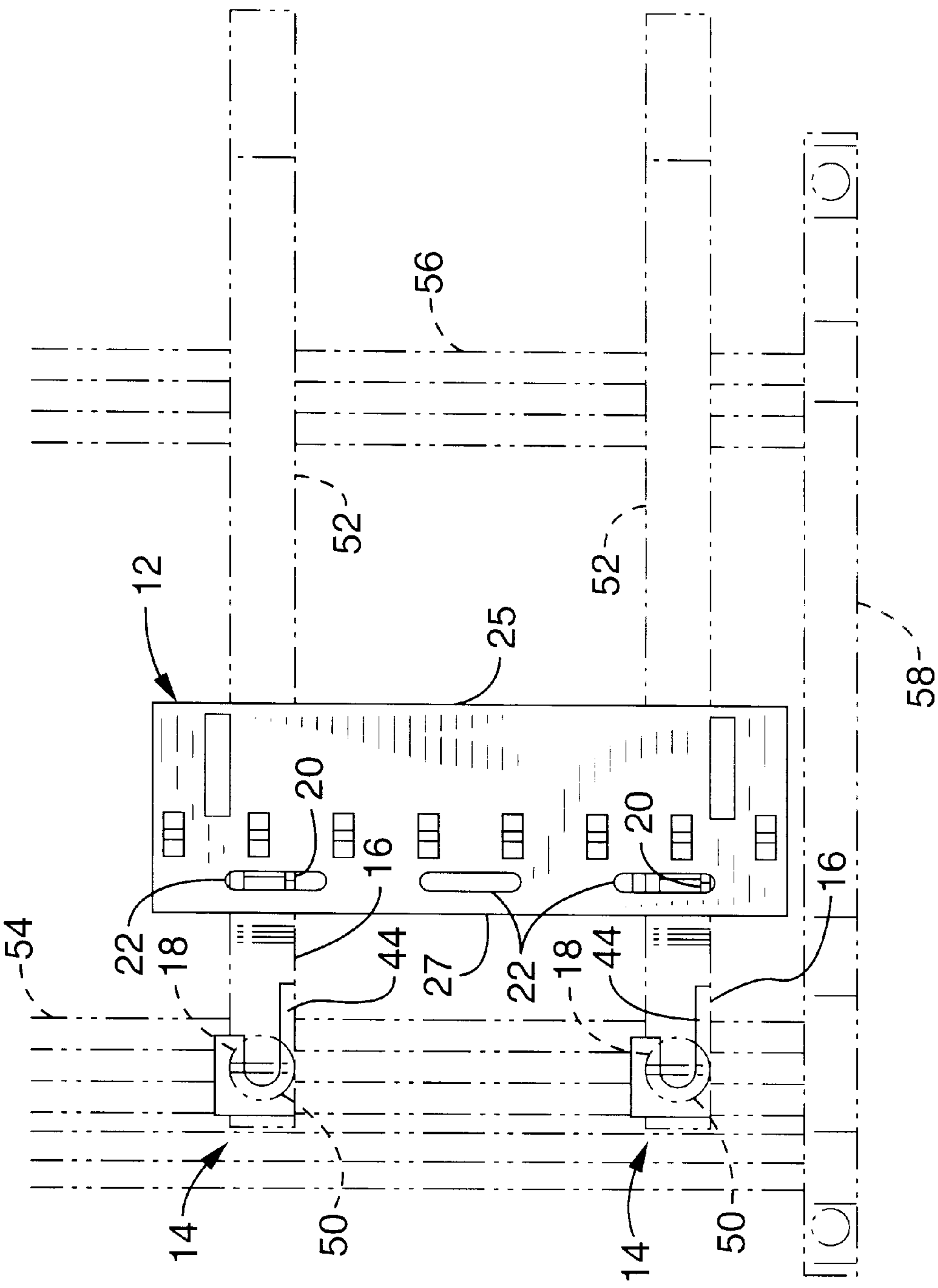
FIG. 5 is a top view of a sensor assembly retained between a pair of mounting brackets according to an embodiment of the present invention, shown attached to the hammer flange and rail assembly within an acoustic piano.

FIG. 5 depicts a sensor assembly 12 being mounted between a pair of mounting brackets 14, which are depicted being retained by fasteners 50 that retain hammer flanges 52 (in phantom) to a hammer rail 54 (in phantom) which makes up a portion of the action stack within an acoustic piano. A hammer rest rail 56 (in phantom) and an action bracket 58 (in phantom) are also shown in relation to the hammer 57 (in phantom) and hammer 59 (in phantom) for reference. It can be seen that sensor assembly 12 is keyed into mounting bracket 14 by way of opening 22 which engages retention tab 20. action bracket 58 (in phantom) are also shown within the instrument for reference. It can be seen that sensor assembly 12 is keyed into mounting bracket 14 by way of opening 22 which engages retention tab 20.

In operation, pressure is applied to biasing retention member 26 through release member 33 to sufficiently displace it so that sensor assembly 12 may be received into mounting bracket 14, adjusted laterally, or released therefrom. It will be appreciated that disengaging biasing retention member 26 requires the application of pressure to release member 33 in a direction away from sensor assembly 12. The disengaging pressure may be preferably applied manually, wherein the user is able to adjust, remove, or insert sensor assembly 12 without the necessity of tools or complex operations. By utilizing release member 33, the sensor assemblies may be inserted, adjusted, or removed with a "one-handed" manual operation. Upon inserting sensor assembly 12 into the pair of mounting brackets 14, protruding retention tab 20 at least partially engages opening 22 in sensor assembly 12. When the user releases pressure on release member 33, the upper portions of biasing member 26 slide over the top surface of sensor assembly 12 to provide vertical retention, as retention tab 20 becomes fully engaged within opening 22. It should be appreciated that the mounting bracket may be fabricated with biasing member 26 oriented at a slight downward angle, such that upon release of release member 33, biasing member 26 has a horizontal longitudinal component of motion toward the sensor board 12 and a downward vertical component of motion toward mounting bracket 14. The edges of notch 34 are driven by biasing member 26 to forcibly engage second lateral edge 27 of sensor assembly 12.

Figure 6:
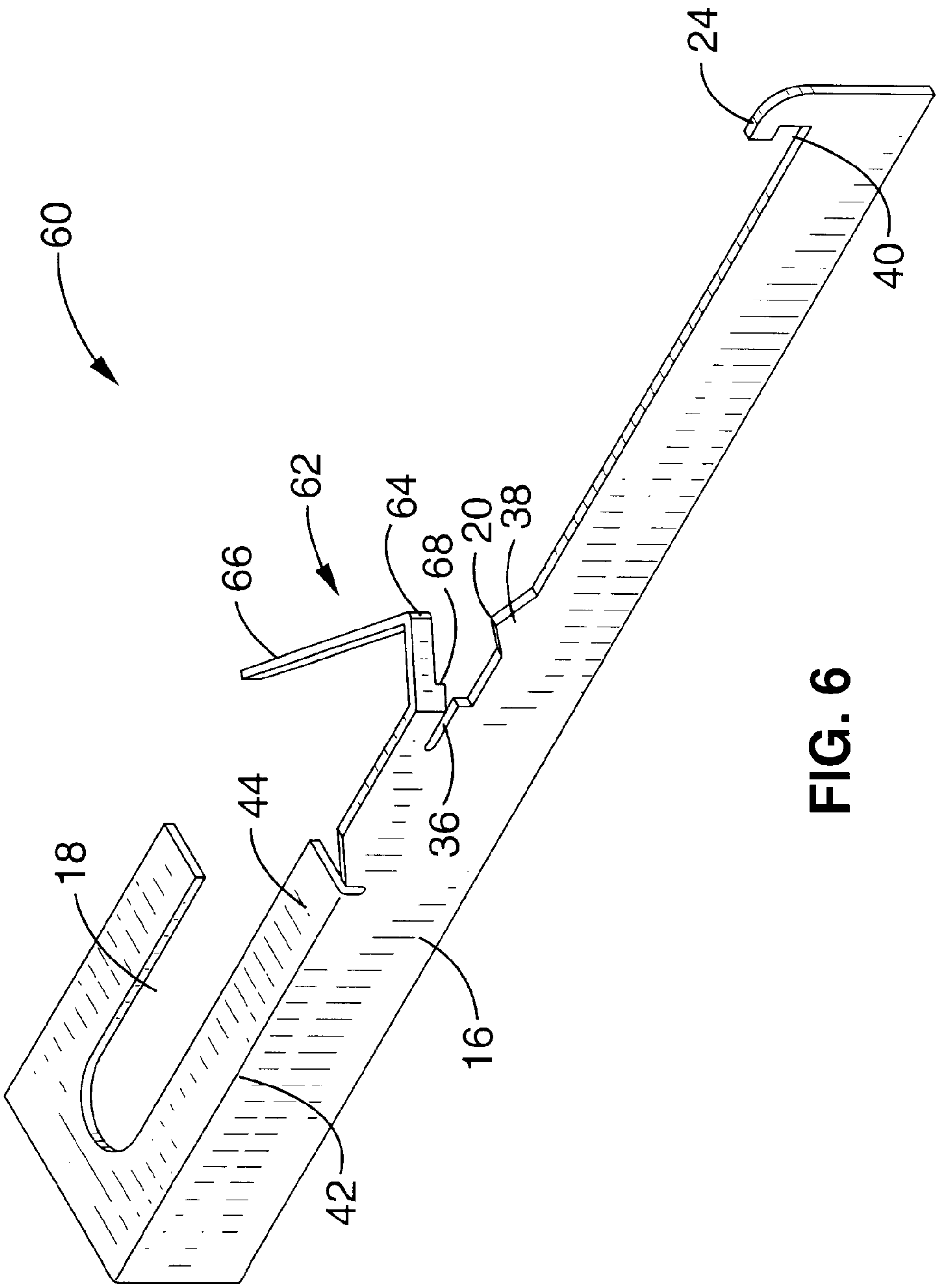
FIG. 6 is a perspective view of a sensor mounting bracket according to another embodiment of the present invention, shown having an extended release member.

FIG. 6 is another embodiment 60 of the invention, which is adapted with a larger biasing retention member 62 having a bend 64 which extends into a release member 66. It will be appreciated that bend 64 is preferably a slightly more acute angle than second bend 32 found in FIG. 3, to accommodate the extra length of release member 66. The use of extended length release member 66 reduces the required amount of force for the removal, insertion, or adjusting of the sensor assembly within the mounting brackets.

Figure 7:
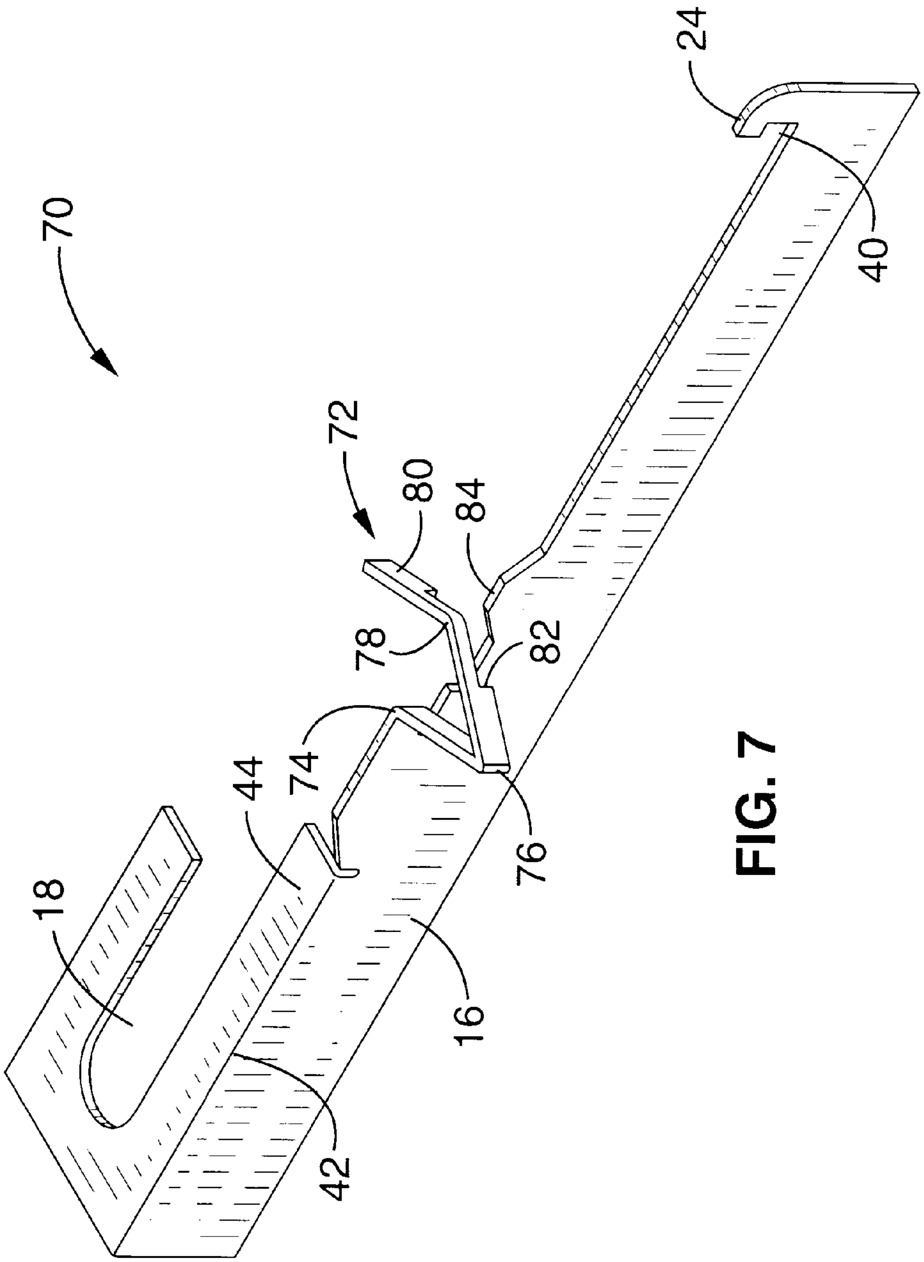
FIG. 7 is a perspective view of a sensor mounting bracket according to another embodiment of the present invention, shown utilizing an additional bend within the biasing retention member to increase compliance.

FIG. 7 is another embodiment 70 of the invention which provides additional compliance within the biasing retention member 72. A first bend 74 is generally directed in a first lateral direction, a second bend 76 spans an acute angle and is directed in an opposing second lateral direction. A third bend 78, shown substantially aligned over the body of the bracket, limits the extension of the retention member over an inserted sensor assembly. A release member 80 extends from third bend 78 to facilitate the application of pressure to the biasing retention member 72. A notch 82 in the lower portion of biasing retention member 72 is configured to engage the top surface and edge surface of an inserted sensor assembly within bracket 70. It will be appreciated that the use of an additional bend within this embodiment of sensor mounting bracket 70 increases the compliance of the bracket and requires the application of less pressure for inserting, releasing, and adjusting the sensor assembly retained therein.

Figure 8:
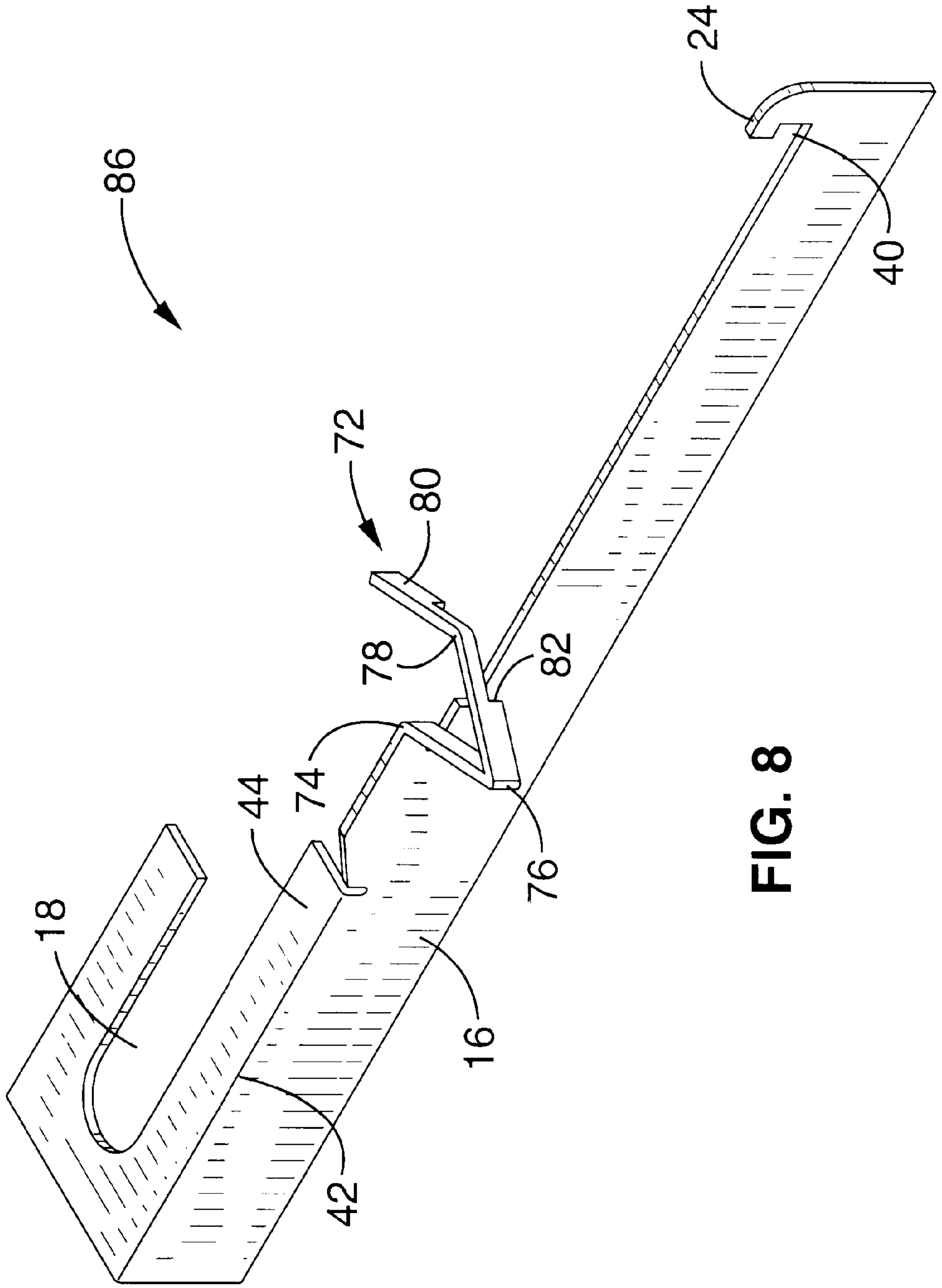
FIG. 8 is a perspective view of a sensor mounting bracket according to another embodiment of the present invention based on FIG. 7, shown without a retention tab.

FIG. 8 is another embodiment 86 of the invention which does not rely on the use of a retention tab, but is otherwise identical to the embodiment depicted in FIG. 7. It will be appreciated that sufficient longitudinal retention may be provided by the biasing retention member 72 in combination with fixed retention member 24 to securely retain a sensor assembly without shifting.

Figure 9:
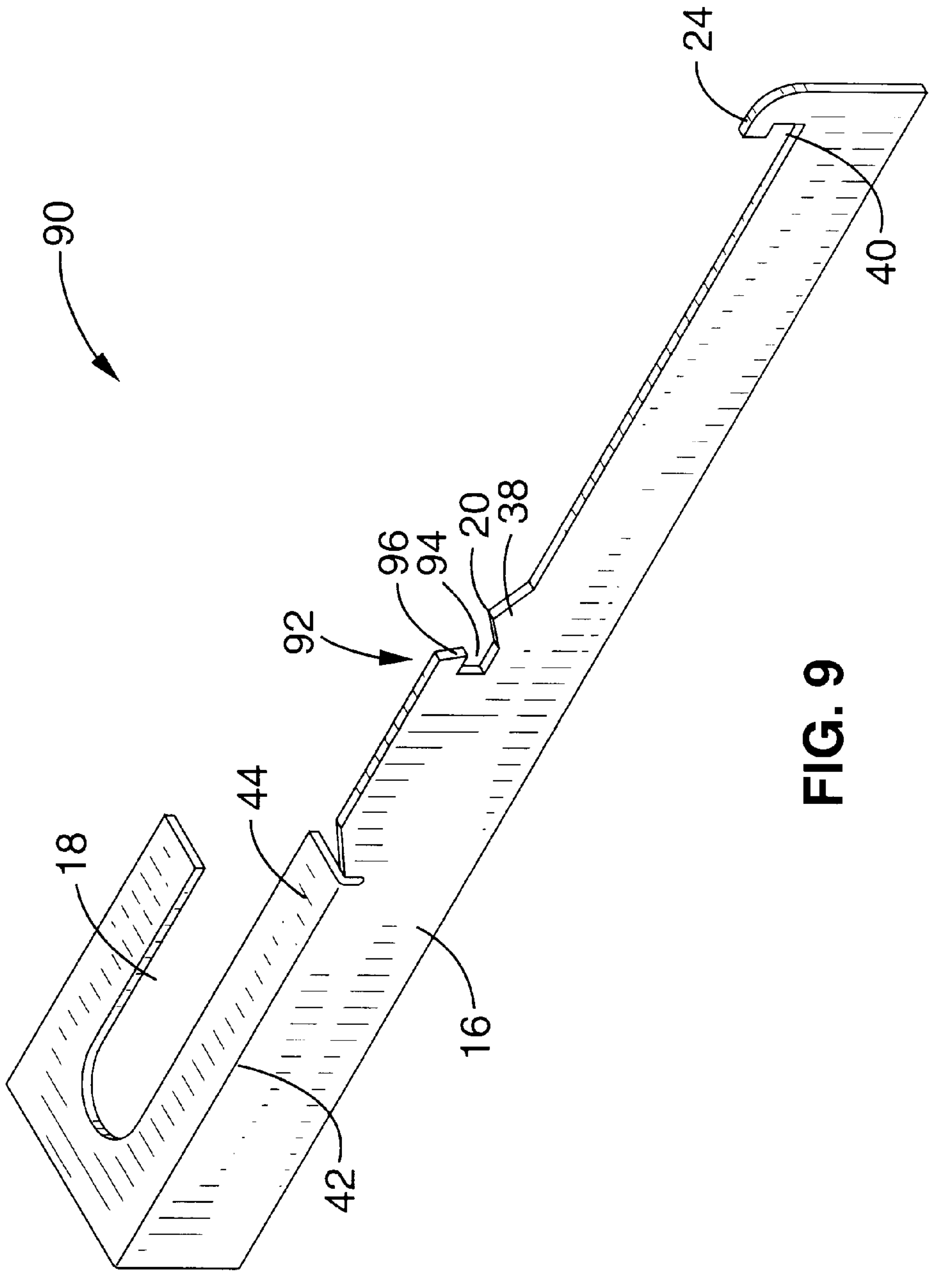
FIG. 9 is a perspective view of a sensor mounting bracket according to another embodiment of the present invention, shown adapted to rely on the compliance of the sensor mounting board for position retention.

FIG. 9 is another embodiment 90 of the invention in which the biasing retention member of the bracket is eliminated and the bracket relies on the compliance of the sensor assembly itself to provide vibration-free secure retention within the bracket. A notched retention lip 92 comprises a notch 94 over which a retention protrusion 96 is positioned. To insert a sensor assembly within sensor bracket 90, a first edge of the sensor assembly is inserted within notch 40 and retention tab 20 is partially inserted within an engagement slot (not shown). The sensor assembly, typically a printed circuit board, flexes under the application of additional pressure and the second edge of the sensor board may be insertably engaged under retention protrusion 96. It should be appreciated that the sensor assembly does not require a slot for receiving retention tab wherein the height of retention tab 20 may be substantially reduced so as just to aid in biasing the sensor assembly during insertion. It should be appreciated that the biasing force to prevent vibration of a received sensor assembly may be created in a number of alternative ways. For example, retention cutout slot 40 of fixed retention member 24 may be sufficiently narrow and oriented at a sufficient upward angle, such that the opposing end of a sensor assembly received therein is upwardly urged, against which pressure must be applied to secure the sensor assembly under retention protrusion 96. It will be appreciated that this mounting configuration can be utilized without the biasing force which is provided by sensor assembly flexure, however, a certain amount of play can then exist between the sensor assembly and the mounting bracket. Therefore, unless at least one of the sensor mounting brackets retaining a given sensor assembly incorporates a biasing mechanism the sensor assembly may be subject to vibration within the mounting bracket.

The described mounting brackets and variations which would be obvious to one of ordinary skill in the art based on the teachings of the present invention, may be utilized individually, or in combination, within an acoustic piano or similar device, to retain substantially planar assemblies, such as sensor assemblies within a fixed position. It will be appreciated that the use of certain bracket combinations could facilitate sensor assembly manipulation within the brackets. By way of example, the bracket of FIG. 7 may be utilized in combination with the bracket of FIG. 9 to retain a single sensor assembly. The insertion of a sensor assembly 12 for retention by the above combination of brackets allows for the simple removal, or re-insertion of the sensor board by applying pressure to the sensor board while operating a single release member.

Accordingly, it will be seen that this invention provides for the mounting of sensor assemblies proximal to the hammer shanks and minimizes the amount of clearance required to reduce the possibility that the mounted sensor assembly will interfere with the operation of the instrument. In addition, the invention simplifies the attachment and removal of sensor assemblies from above the hammer shanks within the acoustic piano, or similar mechanically operated device. It will be appreciated that the described embodiment of the sensor assembly mounting bracket provides retention of a sensor assembly within the bracket without using threaded fasteners while it retains the sensor assembly in a fixed position incapable of shifting. A quick release locking mechanism for attaching the sensor assemblies to the mounting brackets is preferably implemented as a biasing retention member, such as a spring clip, having a release member. It should, however, be appreciated by one of ordinary skill in the art that a number of alternative forms of quick release mechanism may be substituted without departing from the teachings of the present invention. Furthermore, although the locking mechanism is exemplified for engaging the exterior edges of the sensor assembly, it may alternatively be adapted to engage any location on the sensor assembly which is configured with a suitable opening, or other form of engagement receptacle.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A recording sensor assembly in combination with a mounting bracket for supporting said recording sensor assembly in an acoustic piano or equivalent keyboard operated musical instrument, comprising:

a horizontal attachment member adapted to attach to an upper surface of a hammer flange;

a vertical support member attached to said horizontal attachment member, and one or more sensor assembly engagement mechanisms joined to said vertical support member that operate in combination to secure the received sensor assembly within the mounting bracket, wherein at least one of said sensor engagement mechanisms comprises a biased engagement mechanism for retaining the sensor assembly under the action of a biasing force.

2. A mounting bracket as recited in claim 1;

wherein said horizontal attachment member is adapted with an opening through which a hammer flange retention fastener may be inserted for attachment to said upper surface of said hammer flange.

3. A mounting bracket as recited in claim 1:

wherein said vertical support member is oriented to occupy space between adjacent hammer flanges when said horizontal attachment member is attached to the upper surface of said hammer flange.

4. A mounting bracket as recited in claim 3, wherein said vertical support member positions said sensor assembly above said hammer flange.

5. A mounting bracket as recited in claim 1:

wherein said biasing force is supplied by a biasing retention member on said mounting bracket.

6. A mounting bracket as recited in claim 5, further comprising:

a fixed retention member adapted to provide an opposing engagement force in opposition to the biasing force generated by said biasing retention member.

7. A mounting bracket for supporting a recording sensor assembly within an acoustic piano or equivalent keyboard operated musical instrument, comprising:

a support member adapted for attachment to a hammer flange within said instrument;

a sensor board retention member joined to said support member and adapted to receive and retain said recording sensor assembly, said sensor board retention member comprising:

a fixed retention member for restricting motion of said recording sensor assembly along one or more axis;

a biasing retenton member for engaging said sensor assembly in combination with said fixed retention member;

wherein said biasing retention member applies a biasing force to a received sensor assembly to secure said sensor assembly from shifting and vibration; and a protruding retention tab engagement member extending from said sensor board retention member;

said retention tab adapted to engage a matching receptacle of said sensor assembly upon receipt therein within said support member.

8. A mounting bracket as recited in claim 7:

wherein said support member is adapted with an aperture through a substantially horizontal portion of said support member through which a hammer flange fastener may be inserted to attach said support member to a hammer flange within said instrument.

9. A mounting bracket as recited in claim 7:

wherein a portion of said support member is adapted for positioning between hammer flanges in said instrument.

10. A mounting bracket as recited in claim 9:

wherein said support member is shaped with a horizontal portion for attachment over the hammer flanges and an attached vertical portion for positioning between the hammer flanges.

11. A mounting bracket as recited in claim 10:

wherein said support member is adapted to substantially conform to the hammer flange to which it is attached.

12. A mounting bracket as recited in claim 7:

wherein said biasing force is created by flexing of said sensor assembly upon being engaged with said biasing retention member.

13. A mounting bracket as recited in claim 7:

wherein said biasing retention member is compliant and flexes upon receipt of said sensor assembly to apply said biasing force thereto.

14. A mounting bracket as recited in claim 13:

wherein said biasing retention member comprises a spring clip retainer which supplies said biasing force to engage said sensor assembly.

15. A mounting bracket as recited in claim 7:

wherein said retention tab is adapted for at least partial insertion within an aperture of said sensor assembly to be received within said support member.

16. An apparatus for supporting a recording sensor assembly in an acoustic piano or equivalent keyboard operated musical instrument, comprising:

a mounting bracket adapted for attachment to a hammer flange within said instrument;

a locking mechanism incorporated within said mounting bracket that is adapted to receive said recording sensor assembly and apply a biased engagement force thereto; and a release member on said locking mechanism that when acted upon by a sufficient force in a substantially predetermined direction disengages said biased engagement force to allow for the adjustment, removal, or receipt of said sensor assembly; and a keyed retention mechanism which engages said sensor assembly during insertion to restrict longitudinal movement thereof.

17. An apparatus as recited in claim 16:

wherein said attachment adaptation of said mounting bracket comprises a portion of said mounting bracket that at least partially encircles an open area through which a fastener may be engaged to retain said mounting bracket.

18. An apparatus as recited in claim 17:

wherein said open area is of a size and shape for receipt of the shaft of a hammer flange fastener in said instrument.

19. An apparatus as recited in claim 16:

wherein said mounting bracket is shaped to conform to a portion of the horizontal and vertical surfaces of a hammer flange assembly to which it may be affixed.

20. An apparatus as recited in claim 19, wherein said mounting bracket comprises:

a horizontal mounting bracket surface for retention on the horizontal surface of a hammer flange; and a vertical mounting bracket surface joined to said horizontal mounting bracket surface into which said locking mechanism is incorporated.

21. An apparatus as recited in claim 20:

wherein said mounting bracket comprises a metallic material having at least one bend to form said horizontal and said vertical surface.

22. An apparatus as recited in claim 21:

wherein said metallic material comprises spring steel of a thickness between 10 and 30 mils.

23. An apparatus recited in claim 16:

wherein the keyed retention mechanism comprises a protrusion adapted to engage a portion of said sensor assembly.

24. An apparatus as recited in claim 23:

wherein said protrusion is shaped to engage an opening within said sensor assembly.

25. An apparatus as recited in claim 24:

wherein said protrusion is shaped to engage a slotted lateral aperture within said sensor assembly; and wherein said protrusion engaged in said slotted lateral aperture prevents the longitudinal movement of said received sensor assembly within said mounting bracket.

26. An apparatus as recited in claim 25, wherein said locking mechanism, comprises:

a fixed retention member adapted to engage said sensor assembly at a first location; and a biasing retention member adapted to apply a biasing force to substantially lock said sensor assembly within said mounting bracket.

27. An apparatus as recited in claim 26:

wherein said fixed retention member comprises a notched protrusion of said mounting bracket; and wherein said notched protrusion is adapted to engage the material of said sensor assembly when said sensor assembly is inserted into said mounting bracket.

28. An apparatus as recited in claim 26:

wherein said biasing retention member is adapted to allow for displacement thereof to allow for the insertion, adjustment, or removal of said sensor assembly.

29. An apparatus as recited in claim 26, wherein said biasing retention member comprises:

a compliantly coupled sensor assembly engagement member extending from said mounting bracket;

said compliantly coupled sensor assembly engagement member adapted to apply a biasing force to a sensor assembly which has been inserted into said mounting bracket; and wherein said biasing force acts in concert with said fixed retention member to prevent lateral or vertical displacement of said sensor assembly.

30. An apparatus as recited in claim 29, wherein said compliantly coupled sensor assembly engagement member comprises:

an elongated member extending from said mounting bracket; and said elongated member having surfaces to engage a top surface and edge surface within said sensor assembly and apply said biasing force thereto.

31. An apparatus as recited in claim 30:

wherein said elongated member is adapted with a notch;

wherein said notch has a horizontal edge for engaging the top surface of said sensor assembly; and wherein said notch has a vertical edge for engaging an edge surface within said sensor assembly.

32. An apparatus as recited in claim 31:

wherein said vertical edge of said notch is adapted to engage an exterior edge of said sensor assembly.

33. An apparatus as recited in claim 32:

wherein said elongated member comprises an elongated portion extending from said mounting bracket to provide a manually operable spring clip retainer.

34. An apparatus as recited in claim 30:

wherein said elongated member includes at least one bend to provide for compliant movement therein.

35. A mounting bracket for supporting a recording sensor assembly within an acoustic piano or equivalent keyboard operated musical instrument, comprising:

(a) a support member adapted for attachment within said instrument;

(b) a sensor board retention member joined to said support member and adapted to receive and retain said recording sensor assembly; and (c) a protruding retention tab engagement member joined to said sensor board retention member;

(d) said retention tab adapted to engage a matching receptacle of said sensor assembly upon receipt therein within said support member;

(e) wherein said sensor board retention member comprises one or more engagement members which secure said sensor assembly within said mounting bracket;

(f) wherein at least one of said engagement members comprises (i) a fixed retention member for restricting motion along one or more axis; and (ii) a biased retention member for engaging said sensor assembly in combination with said fixed retention member;

(iii) wherein said biasing retention member applies a biasing force to said sensor assembly to secure said sensor assembly from shifting and vibration within said mounting bracket.

36. A mounting bracket as recited in claim 35:

wherein said retention tab is adapted for at least partial insertion within an aperture of said sensor assembly.

37. An apparatus for supporting a recording sensor assembly in an acoustic piano or equivalent keyboard operated musical instrument, comprising:

a mounting bracket adapted for attachment within said instrument;

a locking mechanism incorporated within said mounting bracket that is adapted to receive said recording sensor assembly and apply a biased engagement force thereto;

a release member on said locking mechanism that when acted upon by a sufficient force in a substantially predetermined direction disengages said biased engagement force to allow for the adjustment, removal, or receipt of said sensor assembly; and a keyed retention mechanism which engages said sensor assembly during insertion to restrict longitudinal movement thereof.

38. An apparatus as recited in claim 37:

wherein said attachment adaptation of said mounting bracket comprises a portion of said mounting bracket that at least partially encircles an open area through which a fastener may be engaged to retain said mounting bracket.

39. An apparatus as recited in claim 37:

wherein said open area is of a size and shape for receipt of the shaft of a hammer flange fastener in said instrument.

40. An apparatus as recited in claim 37:

wherein said mounting bracket is shaped to conform to a portion of the horizontal and vertical surfaces of a hammer flange assembly to which it may be affixed.

41. An apparatus as recited in claim 40, wherein said mounting bracket comprises:

a horizontal mounting bracket surface for retention on the horizontal surface of a hammer flange; and a vertical mounting bracket surface joined to said horizontal mounting bracket surface into which said locking mechanism is incorporated.

42. An apparatus as recited in claim 41:

wherein said mounting bracket comprises a metallic material having at least one bend to form said horizontal and said vertical surface.

43. An apparatus as recited in claim 42:

wherein said metallic material comprises spring steel of a thickness between 10 and 30 mils.

44. An apparatus recited in claim 37:

wherein the keyed retention mechanism comprises a protrusion adapted to engage a portion of said sensor assembly.

45. An apparatus as recited in claim 44:

wherein said protrusion is shaped to engage an opening within said sensor assembly.

46. An apparatus as recited in claim 45:

wherein said protrusion is shaped to engage a slotted lateral aperture within said sensor assembly; and wherein said protrusion engaged in said slotted lateral aperture prevents the longitudinal movement of said received sensor assembly within said mounting bracket.

47. An apparatus as recited in claim 46, wherein said locking mechanism, comprises:

a fixed retention member adapted to engage said sensor assembly at a first location; and a biasing retention member adapted to apply a biasing force to substantially lock said sensor assembly within said mounting bracket.

48. An apparatus as recited in claim 47:

wherein said fixed retention member comprises a notched protrusion of said mounting bracket; and wherein said notched protrusion is adapted to engage the material of said sensor assembly when said sensor assembly is inserted into said mounting bracket.

49. An apparatus as recited in claim 47:

wherein said biasing retention member is adapted to allow for displacement thereof to allow for the insertion, adjustment, or removal of said Sensor assembly.

50. An apparatus as recited in claim 47, wherein said biasing retention member comprises:

a compliantly coupled sensor assembly engagement member extending from said mounting bracket;

said compliantly coupled sensor assembly engagement member adapted to apply a biasing force to a sensor assembly which has been inserted into said mounting bracket; and wherein said biasing force acts in concert with said fixed retention member to prevent lateral or vertical displacement of said sensor assembly.

51. An apparatus as recited in claim 50, wherein said compliantly coupled sensor assembly engagement member comprises:

an elongated member extending from said mounting bracket; and said elongated member having surfaces to engage a top surface and edge surface within said sensor assembly and apply said biasing force thereto.

52. An apparatus as recited in claim 51:

wherein said elongated member is adapted with a notch;

wherein said notch has a horizontal edge for engaging the top surface of said sensor assembly; and wherein said notch has a vertical edge for engaging an edge surface within said sensor assembly.

53. An apparatus as recited in claim 52:

wherein said vertical edge of said notch is adapted to engage an exterior edge of said sensor assembly.

* * * * *

UNITED STATES PATENT AND TRADEMARK OFFICE

CERTIFICATE OF CORRECTION

PATENT NO. : 6,712,323 B1
DATED : March 30, 2004
INVENTOR(S) : Alpha Cheung et al.

It is certified that error appears in the above-identified patent and that said Letters Patent is hereby corrected as shown below:

Column 2,
Line 42, change "Within" to -- within --

Column 4,
Line 55, change "as" to -- a --

Column 6,
Line 45, change "t o" to -- to --

Column 8,
Line 7, delete repeated text: "action bracket 58 (in phantom) are also shown in the instrument for reference. It can be seen that the sensor assembly 12 is keyed into mounting bracket 14 by way of opening 22 which engages retention tab 20."

Column 9,
Line 20, insert -- 20 -- after "tab"

Column 10,
Lines 49 and 50, change "the" to -- said --
Line 53, change "the sensor" to -- said sensor --

Column 12,
Line 6, delete "and"

Column 14,
Line 35, change "37" to -- 38 --

UNITED STATES PATENT AND TRADEMARK OFFICE

CERTIFICATE OF CORRECTION

PATENT NO. : 6,712,323 B1
DATED : March 30, 2004
INVENTOR(S) : Alpha Cheung et al.

It is certified that error appears in the above-identified patent and that said Letters Patent is hereby corrected as shown below:

<u>Column 15,</u>
Line 22, change "Sensor" to -- sensor --

Signed and Sealed this

Twenty-eighth Day of June, 2005

JON W. DUDAS
*Director of the United States Patent and Trademark Office*